Oct. 24, 1933.  W. G. MYLIUS  1,932,044

METER COVER

Filed March 18, 1932

WITNESSES:
R. S. Williams
F. H. Miller

INVENTOR
Walter G. Mylius.
BY
ATTORNEY

Patented Oct. 24, 1933

1,932,044

UNITED STATES PATENT OFFICE 1,932,044

METER COVER

Walter G. Mylius, Summit, N. J., assignor to Westinghouse Electric & Manufacturing Company, a corporation of Pennsylvania Application March 18, 1932. Serial No. 599,700

9 Claims. (Cl. 171—34)

My invention relates to meter covers and particularly to glass covers for watthour meters.

One object of my invention is to provide a protective base or mounting means for a meter cover of cup or bowl shape and having side walls constituted of glass or similar material.

Another object of my invention is to provide novel means for connecting a pair of rings constituting a composite base for a meter cover.

Another object of my invention is to preserve finished surfaces against marring, as heretofore effected by spot-welding on such surfaces in a meter cover.

Another object of my invention is to provide a meter cover including a glass member that, in contra-distinction to a usual similar cover having weakened sections in the form of notches for assisting in holding the cover in position, shall have portions of increased thickness and strength included in the holding means.

A further object of my invention is to provide a meter cover that shall be simple and durable in construction, economical to manufacture and effective in its operation.

A modern watthour or other integrating meter for household and industrial applications embodies a base for mounting on a wall, a meter mechanism on the base and a cover of substantially cup-shape covering the front end and sides of the meter.

Certain of these covers are of sheet metal having glass windows and others are almost entirely of glass except for a protective mounting rim about the open end thereof adjacent to the meter base.

In a cover of the latter type, it has been usual to employ a metal rim having lugs for cooperation with recesses in the glass side walls to prevent turning of the rim relative to the glass cover. The recesses in the walls weaken the latter at a position where strength is important, since the weight of the cover is imposed on the glass at this position and, where the cover is connected to the base by a bayonet joint, it is subjected to torsional forces, with the result that breakage frequently occurs.

It is my aim to overcome this objection and to otherwise improve meter covers of the above-indicated type.

Accordingly, in practicing my invention, instead of recesses, I provide lugs which thicken and reinforce the glass wall at its holding position, and other features which enhance the general efficiency, manufacturing facility, durability and neatness of the structure.

Figure 1:
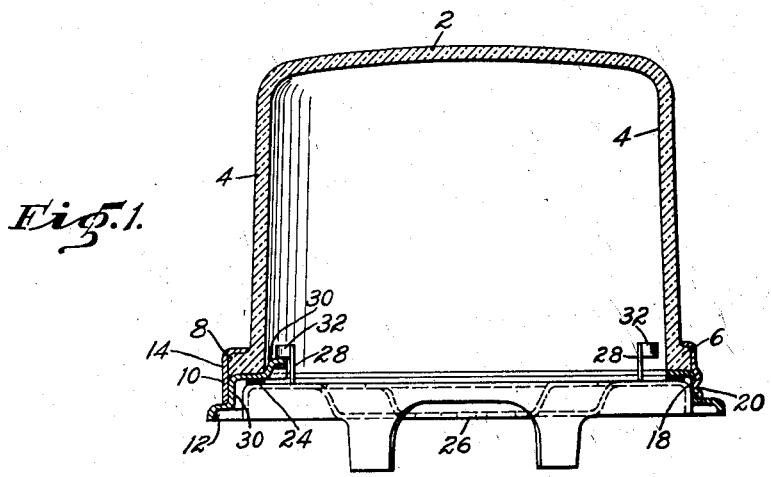
Figure 2:
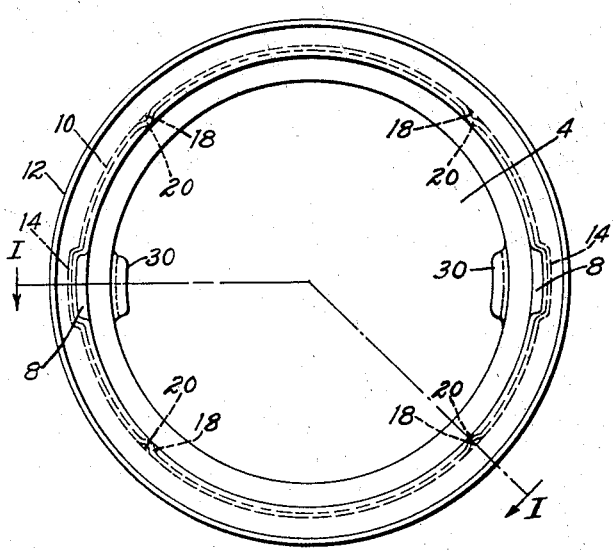

Figure 1 of the accompanying drawing is a side view, in section, of the meter cover of my invention, taken along the line I—I of Fig. 2, and a base with which it cooperates, in elevation.

Figure 3:
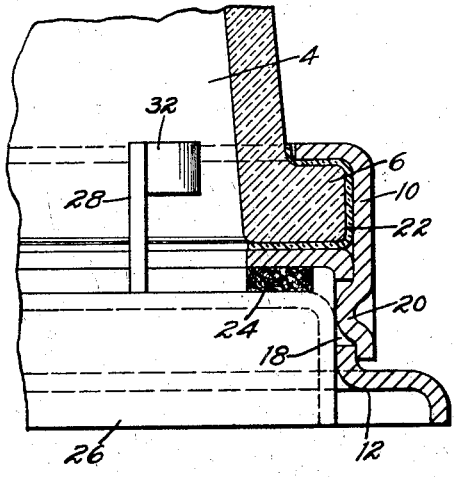

Fig. 2 is a bottom-plan view of the cover of Fig. 1, the base being removed, and Fig. 3 is an enlarged detail view of a portion of the device as shown in Fig. 1.

A cover element of glass or other frangible material that is transparent, or partially transparent and partially translucent or opaque, is of substantially cup-shape preferably having integral end and side walls 2 and 4, respectively, as shown. The walls 2 and 4 may be of different materials and otherwise joined, since the main consideration of my invention is the support and protection of a cover of substantially cup-shape having a substantially tubular side wall of less resistance to breakage than metal at its open end.

The side wall 4 is provided, adjacent to its open end with an outwardly extending perimetral flange 6 having diametrally opposite thickened portions or lugs 8 that also extend outwardly.

A reinforcing and protective ring-like structure on the flange 6 comprises component outer and inner rings 10 and 12, respectively, that are preferably of pressed sheet metal.

The outer ring 10 is flanged to fit the inner transverse surface and the outer longitudinal surface of the flange 6. The ring 10 also has portions 14 receiving and embracing the ends and sides of the lugs 8 to prevent relative movement between the cup and the ring about the longitudinal axis of the cup, and downward longitudinal movement of the ring on the cup, as viewed in the drawing. A portion of the ring 10 closely interfits a portion of the inner ring 12, as shown.

The inner ring 12 is flanged to provide angularly related sections engaging, respectively, the edge of the glass cup and the lower or extended portion of the outer ring 10. A portion of the inner ring 12 is provided with perimetrally spaced openings or recesses 18 in which indentations or projections 20 on the outer ring 10 are disposed. The recesses 18 may be in the outer ring 10 and the indentations 20 in the inner ring 12.

In assembling the rings 10 and 12 on the cup the outer ring 10 is telescopically fitted over the cup to its position on the flange 6 about the lugs 8, and the inner ring 12 is telescopically moved into engagement with the inner end of the glass cover and the exposed inner surface of the ring 10. After this operation, the outer ring is indented opposite the recesses 18 to provide the locking projections 20. Films 22 of gum or other substance may be provided between the adjacent glass and metal surfaces and the rings 10 and 12 related thereto and to the flange 8 with sufficient clamping force to hold the parts securely in position.

An annular gasket 24, of felt or other material, may be secured, as by adhesive material or otherwise, to the inner ring or to a base member 26.

The base member 26, per se, constitutes no part of my present invention and is of any suitable material and shape, preferably in the general form of a disk closely fitted into the bottom of the cover. It is provided with bridge-like elements 28 projecting upwardly therefrom. Portions 30 of the inner ring 12 are placed under cross pieces 32 of the bridges 28 for locking the cover and base together against longitudinal displacement.

The portions 30, constituting integral extensions of the inner ring are so proportioned that they move under the bridge pieces 32 upon relative turning of the cover and base, and in order to insure a resilient and secure fitting, the holding surface of the portions 30 may be inclined slightly downwardly in the direction of rotation of the cover.

In torsionally turning the cover relative to the base to lock and unlock the same, substantial stress is sometimes placed on the glass cover, particularly in unlocking these parts when they have been locked for a long time and have become corroded or otherwise firmly held to each other.

Where, as in the past, the perimetral lock between the glass cover and its protective metal rim included a recessed section of the glass wall and metal projections in the recess or recesses, the torsional force is more apt to fracture the glass than where this glass is thickened or reinforced, as by the lugs 8.

Further, it has been customary to spot weld rings similar to the rings 10 and 12 to each other, which procedure destroys the finish thereof at the points of weld and encourages corrosion. Securing the rings to each other by the recesses 18 and the projections 20 preserves the finish of the metal parts and provides a simpler method of assembly.

The open end of the glass cup is further protected from chipping at any point thereabout by the metal rings and the device results in a substantial improvement in the art to which it relates.

While I have shown and described a particular form of my invention, changes may be effected therein without departing from the spirit and scope thereof, as set forth in the appended claims.

I claim as my invention:

1. A meter cover comprising a cup embodying an outwardly extending perimetral flange provided with diametrally-opposite outwardly projecting lugs, a flanged sheet-metal ring embracing sides of said flange and having portions to receive and embrace said lugs, said ring extending axially of the cup beyond the open end thereof, inwardly extending projections perimetrally-spaced on the extended portion of said ring and a second sheet-metal ring having portions fitting the edge of the cup and the inner surface of said extended portion, respectively, said second ring having spaced recesses for receiving the projections on said first ring.

2. A meter cover comprising a cup embodying a perimetral flange provided with a lug thereon, a flanged sheet-material ring embracing sides of said flange and having a portion to receive and embrace said lug, said ring extending axially of the cup beyond the open end thereof, and a second sheet-material ring having portions fitting the edge of the cup and the inner surface of said extended portion, respectively, one of said rings having a recess and the other having a projection in said recess.

3. A meter cover comprising a cup embodying a perimetral flange provided with a lug, a flanged sheet-material ring embracing sides of said flange and having a portion to receive and embrace said lug, said ring extending axially of the cup beyond the open end thereof, a second sheet-material ring having portions fitting the edge of the cup and the inner surface of said extended portion, and means including said extended portion for holding said rings together.

4. A meter cover comprising a cup embodying a perimetral flange, a flanged sheet-material ring embracing sides of said flange, means securing said ring against perimetral turning relative to the cup, said ring extending away from the cup, and a second sheet-material ring having portions fitting the edge of said cup and a surface of said extended portion, respectively, one of said rings having perimetrally-spaced recesses and the other having projections in said recesses.

5. A meter cover comprising a cup embodying a perimetral flange and a lug thereon, a sheet-material ring embracing sides of said flange, said ring perimetrally interlocking said lug, and a second sheet-material ring having a portion fitting the edge of the cup and a portion secured to the first ring.

6. A meter cover comprising a cup embodying a lug adjacent to the open end thereof, a pair of rings embracing said end, one of the rings perimetrally interlocked the lug, and means holding the rings in position.

7. A meter cover comprising a cup embodying a lug adjacent to the open end thereof and a ring-like structure constituting a protective base for said end secured thereto in perimetral interlocking relation to said lug.

8. A meter cover comprising a cup and a protective base for the open end thereof including a pair of rings having, respectively, a plurality of perimetrally-spaced recesses and a plurality of projections in said recesses for holding the rings together.

9. In combination a meter cover comprising a cup embodying a perimetral flange around the open edge, a flanged sheet-material ring embracing sides of said flange and having a portion extending away from the cup, a second sheet-material ring having portions fitting the edge of said cup and a surface of said extended portion, means including said extended portion for fastening said rings together, a base plate, rotatably interlockable means for securing the cover to the base plate comprising portions extending from said second ring and cooperating means on said base plate.

WALTER G. MYLIUS.